(12) United States Patent
Geurts

(10) Patent No.: US 6,240,764 B1
(45) Date of Patent: Jun. 5, 2001

(54) J-CHANNEL SIDING CUTTER

(75) Inventor: Dennis G. Geurts, Buffalo, MN (US)

(73) Assignee: Malco Products, Inc., Annandale, MN (US)

( * ) Notice: Subject to any disclaimer, the term of this patent is extended or adjusted under 35 U.S.C. 154(b) by 0 days.

(21) Appl. No.: 09/074,759

(22) Filed: May 8, 1998

Related U.S. Application Data

(60) Provisional application No. 60/046,250, filed on May 12, 1997.

(51) Int. Cl.$^7$ .................................................... B21D 28/10
(52) U.S. Cl. ............................ 72/326; 72/409.01; 30/229
(58) Field of Search ................................. 72/326, 409.01; 30/229, 258, 233, 200

(56) References Cited

U.S. PATENT DOCUMENTS

| | | | |
|---|---|---|---|
| 2,340,937 | * | 2/1944 | Curtis ...................................... 30/229 |
| 2,595,841 | * | 5/1952 | Glick ........................................ 30/229 |
| 2,751,681 | * | 6/1956 | Hillson .................................... 30/229 |
| 4,106,195 | * | 8/1978 | Berg ......................................... 30/229 |
| 4,177,664 | * | 12/1979 | Spors ...................................... 72/326 |
| 4,446,623 | * | 5/1984 | Stubbersfield ......................... 30/229 |
| 4,689,884 | * | 9/1987 | Chavarria ............................... 30/229 |
| 5,483,746 | | 1/1996 | Beyers ..................................... 30/229 |

FOREIGN PATENT DOCUMENTS

| | | | |
|---|---|---|---|
| 115615 | * | 5/1918 | (GB) ....................................... 30/229 |

\* cited by examiner

*Primary Examiner*—Daniel C. Crane
(74) *Attorney, Agent, or Firm*—Gerald E. Helget; Rider Bennett Egan & Arundel

(57) ABSTRACT

The J-channel siding tool is preferably used to cut tabs or notches or a miter finishing cut in J-channel vinyl or aluminum siding in perpendicularly adjacent pieces proximate to the corners of doors or windows of a building, through the one cut operation of the tool by an individual. The J-channel siding cutter includes a pair of pivotally interconnected handles, a first cutter having a pair of first cutting surfaces and a first traverse cutting surface on one of the handles, and a second cutter having a pair of second cutting surfaces and a second traverse cutting surface on the other handle. The second traverse cutting surface is recessed with respect to the first traverse cutting surface to enable an individual to selectively determine, in one cut, whether to create a tab or notch within J-channel siding. The first cutter may also include a stop for defining a uniform length of tab or notch. The J-channel siding tool may also include a biasing member disposed between the pair of handles for urging the handles apart and separating the first cutter from the second cutter while in the at-rest position. A travel limiter may also be disposed between the first and second handles for restricting the positioning of the first cutter relative to the second cutter and the closure of the handles relative to each other.

14 Claims, 6 Drawing Sheets

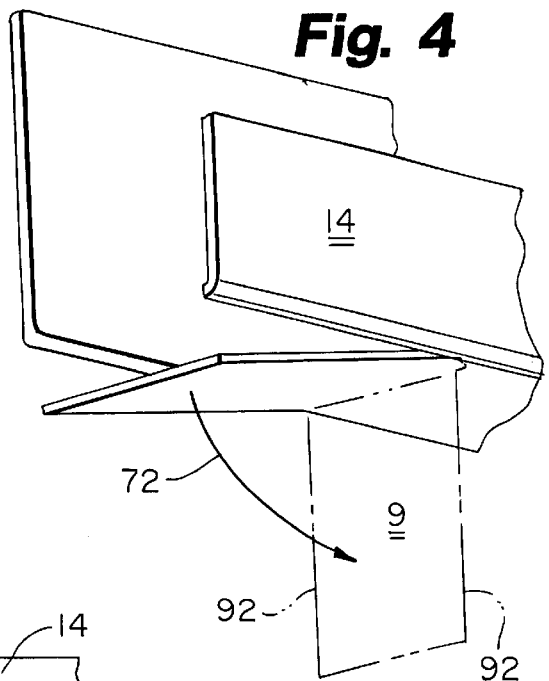
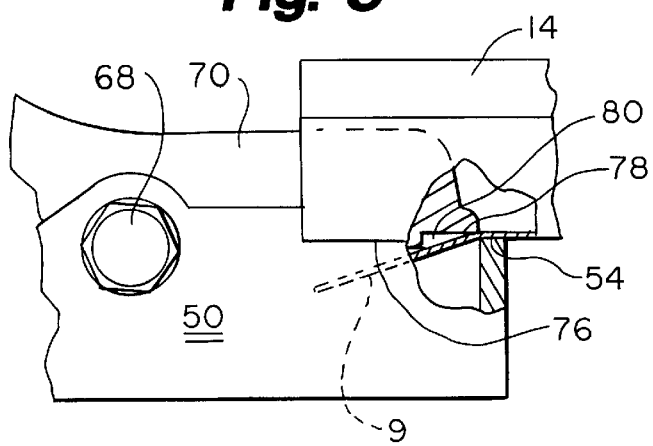
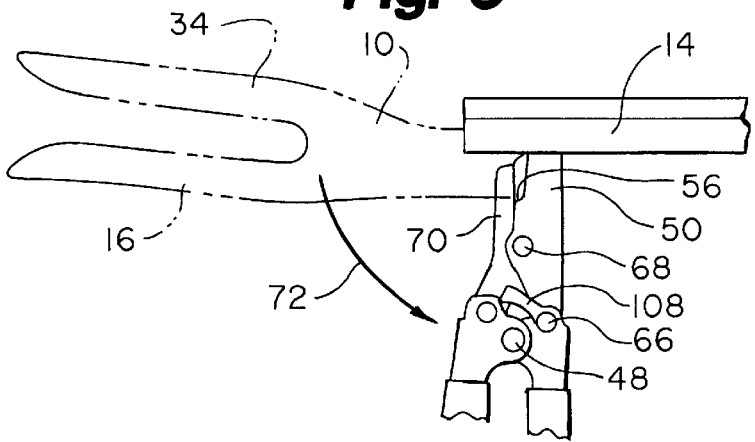

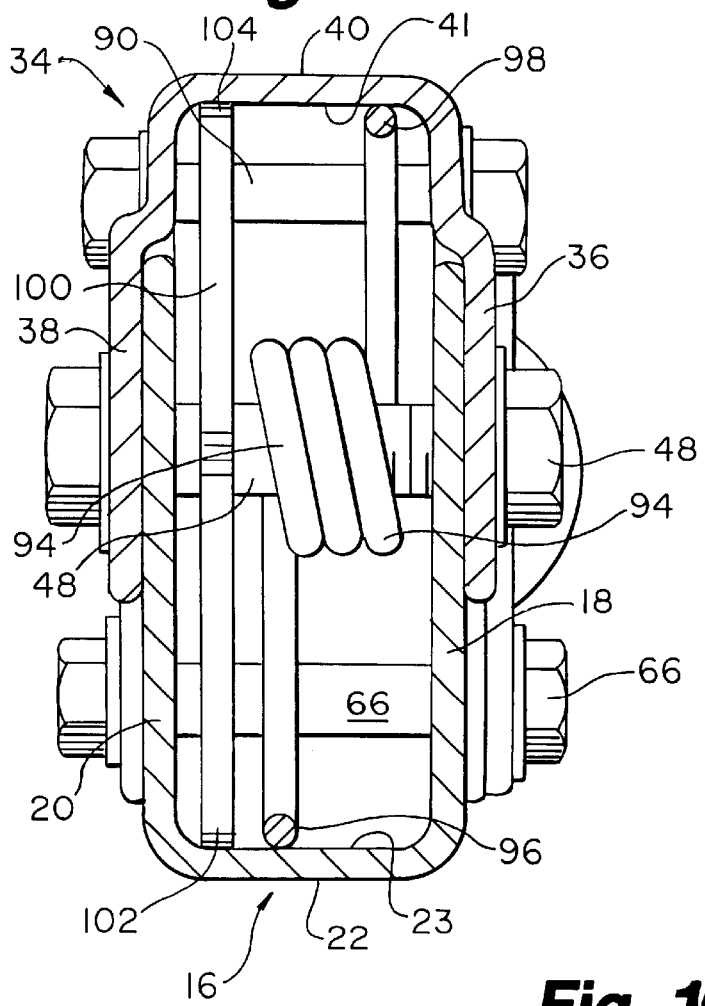
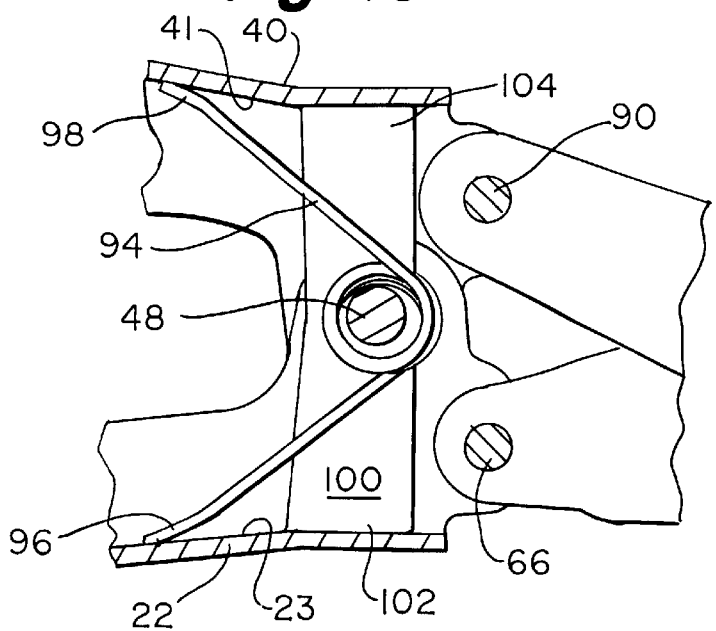

J-CHANNEL SIDING CUTTER

This utility application is based upon the provisional patent application Ser. No. 60/046,250, filed on May 12, 1997, where applicant claims priority to application Ser. No. 60/046,250, as filed on May 12, 1997, herein.

BACKGROUND OF THE INVENTION

The J-channel siding tool significantly increases the ease of creating drainage tabs, notches, and miter cuts during the installation of J-channel siding, proximate to doors and windows of a building.

In the past, an individual, during finishing activities of siding installation, was required to use a duckbill or aviation-type of snip to cut tabs and/or notches into J-channel siding for finishing areas adjacent to doors and windows. Placement of J-channel siding proximate to the corners of doors and windows was especially problematic in that the use of an aviation snip for creation of tabs and/or notches for mating or interlocking of the J-channel siding pieces proximate to a corner was extremely difficult and time consuming. In order to create a tab or notch for mating of perpendicular pieces of J-channel siding, an individual in the past was required to make at least two or three separate and distinct cuts within the confined space of a J-channel. An individual was frequently required to use his or her best efforts to position the cuts in a desired location while simultaneously attempting to make the separate cuts the same length for creation of a rectangular shaped tab or notch. The individual's efforts in making the distinct and separate cuts, of uniform length, in a desired location within the confined space of a J-channel, was extremely challenging and time consuming. As such, significant time loss to workmen occurred in conjunction with the associated material waste due to inaccurate and/or unusable cuts.

An attempt to solve this problem is disclosed in U.S. Pat. No. 5,483,746 to Byers, which created a siding cutting tool which made narrow slits in siding at a location as desired by an individual. This patent failed to solve the initial problem of eliminating the necessity for an individual to make multiple cuts for creation of tabs and/or notches within adjacent pieces of J-channel siding. In addition, the '746 patent failed to solve the problem of making cuts within the J-channel of uniform size. Further, the '746 patent failed to provide a tool which maximized the flexibility to a user, enabling an individual to selectively make a tab or notch through the one-step or cut operation of the tool. As such, the '746 patent may have represented a perceived improvement over the duckbill or aviation-type of snip, without solving the efficiency and related problems associated with finishing and installation of mating adjacent perpendicular pieces of siding proximate to the doors and windows of a building.

A J-channel siding tool is needed to minimize installation time and maximize efficiency of a worker for installing and mating adjacent pieces of perpendicular J-channel siding proximate to the doors and/or windows of a building. The J-channel siding tool enables a worker to place, in a one-cut operation, a drainage/mating tab, notch, or miter finish cut within J-channel siding.

SUMMARY OF THE INVENTION

The J-channel siding tool is preferably used to cut tabs or notches or a miter finishing cut in J-channel vinyl or aluminum siding in perpendicularly adjacent pieces proximate to the corners of doors or windows of a building, through the one cut operation of the tool by an individual.

The J-channel siding cutter includes a pair of pivotally interconnected handles, a first cutter having a pair of first cutting surfaces and a first traverse cutting surface on one of the handles, and a second cutter having a pair of second cutting surfaces and a second traverse cutting surface on the other handle. The second traverse cutting surface is recessed with respect to the pair of second cutting surfaces to enable an individual to selectively determine, in one cut, whether to create a tab or notch within J-channel siding. The first cutter may also include a stop for defining a uniform length of tab or notch. The J-channel siding tool may also include a biasing member disposed between the pair of handles for urging the handles apart and separating the first cutter from the second cutter while in the at-rest position. A travel limiter may also be disposed between the first and second handles for restricting the positioning of the first cutter relative to the second cutter and the closure of the handles relative to each other.

It is a principal object of the present invention to provide a new and improved J-channel siding tool of relatively simple and inexpensive design, construction, and operation, which is safe and durable and which fulfills the intended purpose of creating drainage/mating tabs, notches, and miter cuts within J-channel siding without fear of injury to persons and/or damage to property.

It is another object of the present invention to provide a J-channel siding tool which enables a workman to establish a drainage/mating tab, notch, or miter cut within J-channel siding through a one-cut operation by an individual.

It is still another object of the present invention to provide a J-channel siding tool of lightweight and durable construction which may be used in either hand by an individual.

It is still another object of the present invention to provide a J-channel siding tool which is safe and minimizes the chance of cutting, pinching, or infliction of other bodily harm to an individual during normal use.

It is still another object of the present invention to provide a J-channel siding tool which may be utilized with ⅜", ⅝", ½", or ¾ J-channel vinyl or aluminum siding.

It is still another object of the present invention to enhance the cutting speed of J-channel siding for creation of drainage/mating tabs, notches, or miter cuts as compared to either a duckbill or aviation-type of snip.

It is still another object of the present invention to provide a J-channel siding tool which is rust resistant.

A principal feature of the present invention is the provision of a pair of pivotally interconnected handles which may include non-slip grasping surfaces and/or thumb or finger notches for ease of grasping by an individual.

Another principal feature of the present invention is the provision of a first cutter having a pair of first cutting surfaces and a first traverse cutting surface where the first cutter is mounted on one of the handles.

Still another principal feature of the present invention is the provision of a second cutter having a pair of second cutting surfaces and a recessed second traverse cutting surface where the second cutter is engaged to the other handle.

Still another principal feature of the of the present invention is the recess of the second traverse cutting surface relative to the first traverse cutting surface which enables an individual to selectively determine, in one-cut, whether to create a tab or notch within J-channel siding.

Still another feature of the present invention is the provision of a stop within either the first or second cutters for defining a uniform length of cut for a tab or notch within J-channel siding.

Still another feature of the present invention is the provision of a biasing member disposed between the pair of handles for urging the handles apart and separating the first cutter from the second cutter while in the at-rest position.

Still another feature of the present invention is the provision of a travel limiter disposed between the first and second handles for restricting the closed positioning of the first cutter relative to the second cutter and the closure of the handles relative to each other.

Still another feature of the present invention is the provision of a pair of substantially parallel first cutting surfaces and a first traverse cutting surface which, together, are substantially U-shaped.

Still another feature of the present invention is the provision of a pair of substantially parallel second cutting surfaces and a recessed second traverse cutting surface which, together, are substantially U-shaped.

Still another feature of the present invention is the provision of a first cutter which is pivotally engaged to the first handle.

Still another feature of the present invention is the provision of a second cutter which is pivotally engaged to the second handle.

Still another feature of the present invention is the provision of a first cutter which is pivotally connected to a second cutter.

Still another feature of the present invention is the provision of an intermediate cutting position wherein a pair of substantially parallel cuts of defined length are made within J-channel siding for formation of a mating tab.

Still another feature of the present invention is the provision of a closed cutting position where the recessed second traverse cutting surface engages the first traverse cutting surface for establishment of a pair of parallel cuts and a traverse cut within the channel of J-channel siding for creation of a notch.

Still another feature of the present invention is the provision of a latch pivotally attached to either the first or second handles adapted for holding the handles adjacent to each other during storage of the tool for cutting siding.

BRIEF DESCRIPTION OF THE DRAWINGS

FIG. 4 is a detailed view of a cut piece of J-channel siding.

FIG. 5 is partial phantom line side view of the J-channel cutter, cutting a piece of J-channel siding.

FIG. 6 is a perspective view of the J-channel cutter forming a tab.

FIG. 9 is a cross-sectional end view of the J-channel cutter taken along the line 9—9 of FIG. 1.

FIG. 10 is a detailed cross-section side view of FIG. 9.

DESCRIPTION OF THE PREFERRED EMBODIMENT

Figure 1:
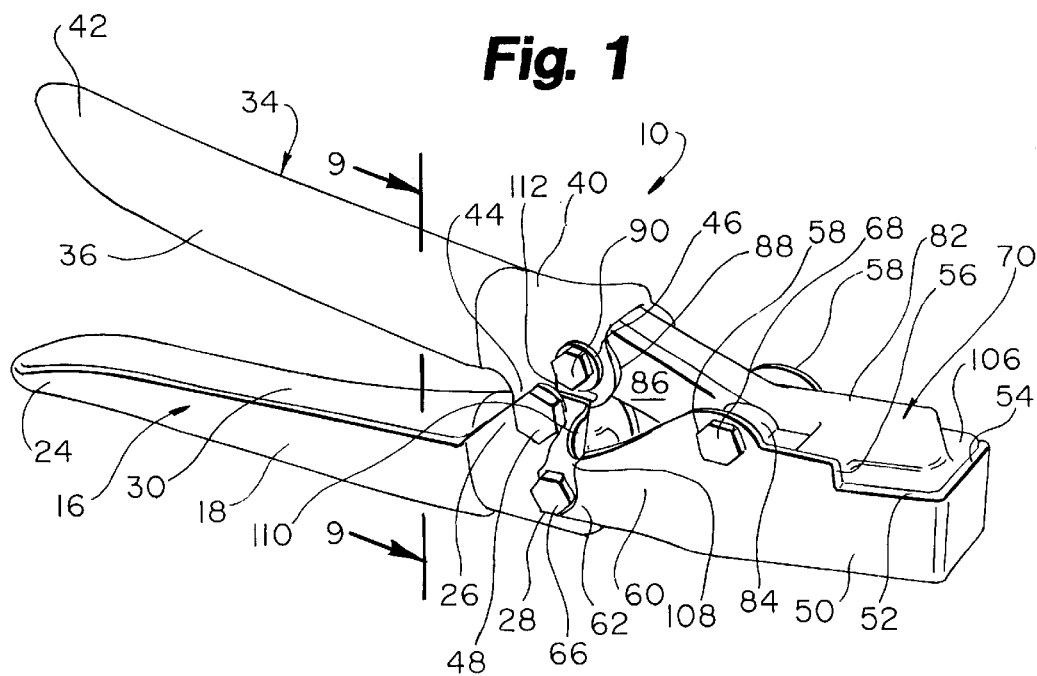
FIG. 1 is an isometric view of the J-channel cutter.
Figure 3:
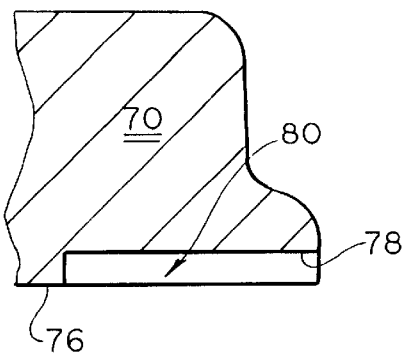
FIG. 3 is a cross-sectional side view of the second cutter taken along the line 3—3 of FIG. 2.

One form of the J-channel cutter is described and disclosed herein. In general, the J-channel cutter is referred to by the numeral 10. The J-channel cutter 10 is preferably used to make either notches 74 or drain tab cuts 9 in a one-cut operation within J-channel siding 14 during the installation of siding adjacent to doors and/or windows in a building.

The J-channel cutter 10 preferably includes a first handle 16 which may be formed of plated metal, nickel-plated metal, heat-treated metal, stainless steel, or any other metal or sturdy material as desired by an individual. The first handle 16 is preferably fabricated to define a first side 18, a second side 20, a first bridge 22 extending between the first and second sides 18, 20 and an open interior which defines a first interior ledge 23 which is the underside of the first bridge 22. The first handle 16 is therefore substantially U-shaped having a sufficient length dimension to facilitate grasping by an individual. Opposite to the grasping end 24 is preferably located a pair of first tab areas 26 and a pair of second tab areas 28. Each of the pair of first tab areas 26 and pair of second tab areas 28 preferably include aligned apertures therethrough to facilitate assembly and pivotal rotation of the first handle 16 relative to the J-channel cutter 10.

A grasping surface 30 is preferably applied to the exterior of the first handle 16. The grasping surface 30 may include a thumb or finger stop 32 or finger grooves to facilitate grasping and minimize slippage during use of the J-channel cutter 10. The grasping surface 30 in conjunction with the shape of the first handle 16 is preferably designed for ergonomic comfort to reduce or minimize stress to an individual's hands during use of the J-channel cutter 10. The grasping surface 30 may be formed of vinyl, plastic, and/or rubber material at the discretion of an individual. The grasping surface 30 is preferably adapted to enhance the comfort to a user over repeated operations and use of the J-channel cutter 10.

A second handle 34 is also preferably fabricated or formed of plated metal, nickel-plated metal, heat-treated metal, stainless steel, and/or any other metal or sturdy material as desired by an individual. The second handle 34 is preferably fabricated to define a first side 36, a second side 38, a second bridge 40 extending between the first and second sides 36, 38 and an open interior which defines a second interior ledge 41 which is the underside of the second bridge 40. The second handle 34 is, therefore, also substantially U-shaped having a sufficient length dimension to facilitate grasping by an individual. Opposite to the grasping end 42 is preferably located a pair of third tab areas 44 and a pair of fourth tab areas 46. Each of the pair of third tab areas 44 and pair of fourth tab areas 46 preferably include aligned apertures therethrough to facilitate assembly and pivotal rotation of a second handle 34 relative to the first handle 16.

Another grasping surface 30 as earlier described is preferably engaged to the second handle 34.

A first pivot mechanism 48 preferably traverses the apertures of the pair of first tab areas 26 and the apertures of the pair of third tab areas 44 to pivotally connect the first handle 16 to the second handle 34. The first pivot mechanism 48 may be formed of a locking nut and bolt, pin, cotter pin, and/or any other sturdy pivotal affixation mechanism as desired by an individual provided that the essential functions, features, and attributes described herein are not sacrificed. It should be noted that the first pivot mechanism 48 preferably permits repeated pivotal rotation of the first handle 16 relative to the second handle 34 during use of the J-channel cutter 10.

In this embodiment, the pair of first tab areas 26 are positioned immediately adjacent and interior to the pair of third tab areas 44. Therefore, the distance dimension between the pair of first tab areas 26 is less than the distance dimension between the pair of third tab areas 44. It should be noted that in another embodiment that the pair of first tab areas 26 may be positioned immediately adjacent to the exterior of the pair of third tab areas 44 at the discretion of an individual.

The pair of second tab areas 28 are preferably adapted for pivotal receiving engagement of the first cutter 50. The first cutter 50 preferably includes a pair of substantially parallel first cutting surfaces 52 and a first traverse cutting surface 54 extending between the pair of substantially parallel first cutting surfaces 52. The first cutter 50 also preferably includes a stop 56 and a pair of fifth tab areas 58 having aligned apertures therethrough, and a first tang 60 having a pair of sixth tab areas 62 having aligned apertures therethrough. The first tang also defines a third ledge 64.

The first cutter 50 is preferably pivotally engaged to the first handle 16 through the use of a second pivot mechanism 66 which is preferably positioned through the pair of aligned apertures which traverse the second tab area 28 and the pair of aligned apertures which traverse the sixth tab area 62 of the first tang 60. The second pivot mechanism 66 may also be formed of a bolt and locking nut, pin, cotter pin, and/or any other sturdy desired pivotal affixation mechanism provided that the essential functions, features, and attributes described herein are not sacrificed.

The first cutter 50 is preferably open proximate to the pair of substantially parallel first cutting surfaces 52 and first traverse cutting surface 54 in order to facilitate the positioning of the J-channel siding 14 for cutting. The first cutter 50 is preferably open opposite to the pair of substantially parallel first cutting surfaces 52 and first traverse cutting surface 54 in order to facilitate the separation, and removal of, a tab 9 of J-channel siding 14 following cutting.

The pair of fifth tab areas 58 are preferably designed to have a pair of aligned apertures therethrough which are further adapted for receiving engagement of the third pivot mechanism 68 which pivotally connects the first cutter 50 to the second cutter 70.

The first tang 60 is preferably designed to provide structural strength and support for the first cutter 50, and is adapted to include the pair of sixth tab areas 62 having aligned apertures therethrough. The second pivot mechanism 66 preferably traverses the pair of sixth tab areas 62 for insertion through the aligned apertures of the pair of second tab areas 28 to pivotally attach the first cutter 50 to the first handle 16.

The pair of substantially parallel first cutting surfaces 52 are preferably adapted to make a pair of parallel cuts within J-channel siding 14 in a one-cut operation. It should be noted that the pair of substantially parallel first cutting surfaces 52 are not designed to separate a tab 9 from J-channel siding 14 but are designed to place parallel cuts as depicted in FIGS. 4–6. An individual may then bend the J-channel cutter 10 downwardly in an arc as depicted by arrow 72 to create a tab 9 being substantially perpendicular to the J-channel siding 14 and not separated therefrom. It should be noted that the distance of separation between the pair of substantially parallel first cutting surfaces 52 may vary at the discretion of an individual and preferably have a separation distance of either ½, ⅝ inch or ¾ inch in width dimension for establishment of a tab 9 for use in the installation of siding upon a building.

The stop 56 preferably functions to limit the positioning of the first cutter 50 relative to a piece of J-channel siding 14 by limiting the distance of insertion of the siding 14 within the J-channel cutter 10. The stop 56 is an insertion limiter which assists and enhances an individual's ability to quickly and consistently create cuts or tabs 9 within J-channel siding 14 having a uniform length and width dimension to assist an individual in finishing activities proximate to a door or window. As such, the stop 56 functions as a ledge prohibiting further insertion of J-channel siding 14 within the J-channel cutter 10 during siding cutting activities.

The third ledge 64 of the first tang 60 is preferably adapted to engage the fourth pivot mechanism 90 to limit the opening of the J-channel cutter 10 for insertion of a piece of J-channel siding 14 during cutting activities. The third ledge 64 is preferably separated from the fourth pivot mechanism 90 during the at-rest position or storage of the J-channel cutter 10. In the storage or at-rest position the first handle 16 and the second handle 34 are preferably proximate to each other and the first cutter 50 is preferably fully engaged with the second cutter 70. In this at-rest or storage position, the first handle 16 and the second handle 34 are preferably substantially parallel with respect to each other and the first cutter 50 and the second cutter 70 are in the same approximate plane as the first handle 16 and the second handle 34 respectively.

In the open or operative position, the third ledge 64 of the first tang 60 is preferably positioned adjacent to and in engagement with the fourth pivot mechanism 90 which functions as a stop or limiter restricting the opening of the first cutter 50 relative to the second cutter 70.

In an alternative embodiment, the first cutter 50 may be fixedly positioned relative to the first handle 16. In this embodiment, the manipulation of the second handle 34 and first handle 16 together preferably positions the second cutter 70 into an operative cutting position relative to the first cutter 50.

The second cutter 70 preferably includes a pair of substantially parallel second cutting surfaces 76 and a recessed second traverse cutting surface 78 extending between the pair of substantially parallel second cutting surfaces 76. The second cutter 70 also preferably includes a recessed area 80 proximate to the recessed second traverse cutting surface 78, a support rib 82 having a first support cylinder 84 having an aperture or bore therethrough, and a second tang 86 having a second support cylinder 88 having an aperture or bore therethrough.

The second cutter 70 is preferably pivotally engaged to the second handle 34 through the use of the fourth pivot mechanism 90 which is positioned through the pair of aligned apertures which traverse the fourth tab area 46 and which further pass through the bore or aperture through the second support cylinder 88 of the second tang 86. The fourth pivot mechanism 90 may also be formed of a bolt and locking nut, pin, cotter pin, and/or any other sturdy pivotal affixation mechanism as desired by an individual provided that the essential functions, features, and attributes described herein are not sacrificed.

The second cutter 70 is also preferably pivotally engaged to the first cutter 50 through the third pivot mechanism 68 which traverses the aligned apertures of the pair of fifth tab areas 58 and the bore or aperture through the first support cylinder 84 of the support rib 82. The second pivot mechanism 66, the third pivot mechanism 68, and the fourth pivot mechanism 90, therefore establish a three-point attachment of the first cutter 50 and second cutter 70 to the first and second handles 16, 34 respectively about the first pivot mechanism 48.

In more detail, the substantially parallel second cutting surfaces 76 in conjunction with a pair of substantially parallel first cutting surfaces 52, upon manipulation of the first handle 16 and second handle 34 together, act in a shearing relationship to create a pair of substantially parallel cuts 92 of equal length within J-channel siding 14 as depicted in FIG. 4. An individual may then bend the J-channel siding 14 by rotation of the J-channel cutter 10 approximately 90° downwardly as depicted by arrow 72 of FIG. 6 to create a tab 9. It should be noted that the tab 9 is not removed from the J-channel siding 14 in this initial cutting operation.

Figure 7:
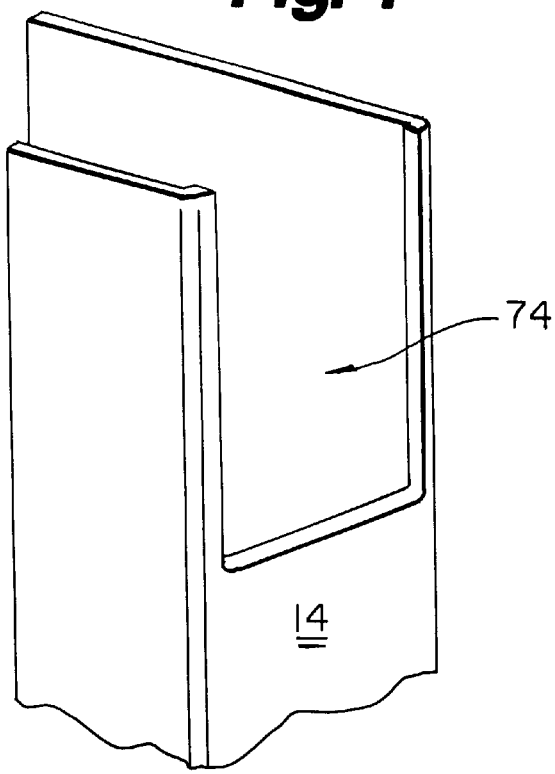
FIG. 7 is a detailed view of a cut piece of J-channel siding forming a notch.
Figure 8:
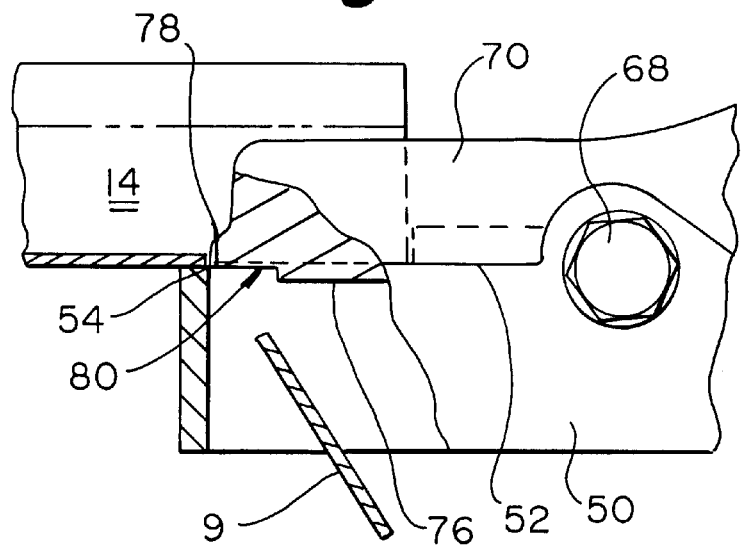
FIG. 8 is a partial phantom line side view of the J-channel cutter forming the J-channel siding notch of FIG. 7.
Figure 11:
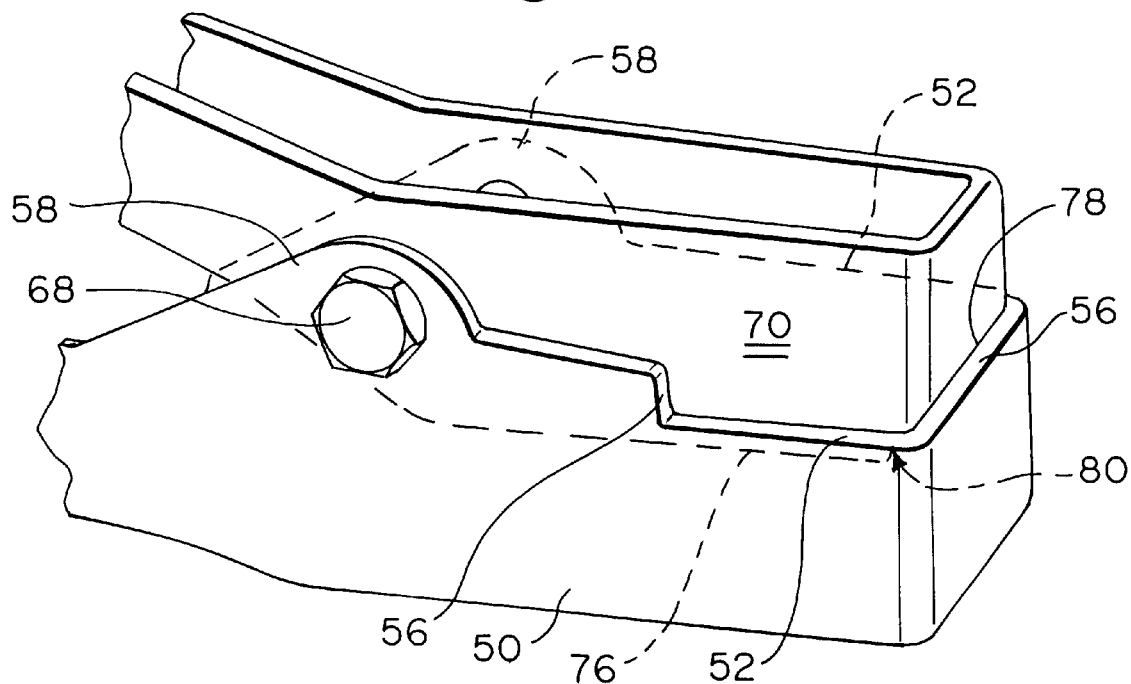
FIG. 11 is an alternative detailed environmental view of the first cutter and second cutter.
Figure 12:
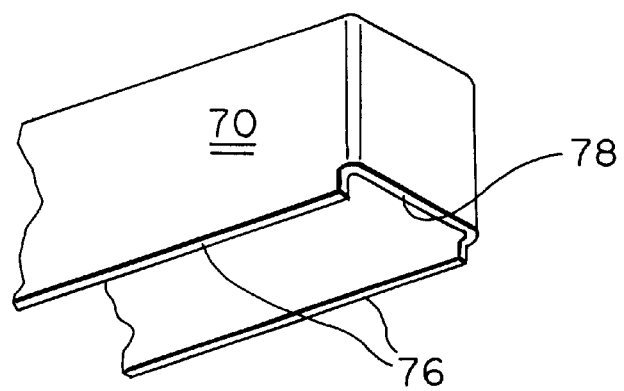
FIG. 12 is an alternative detailed view of the second cutter.
Figure 13:
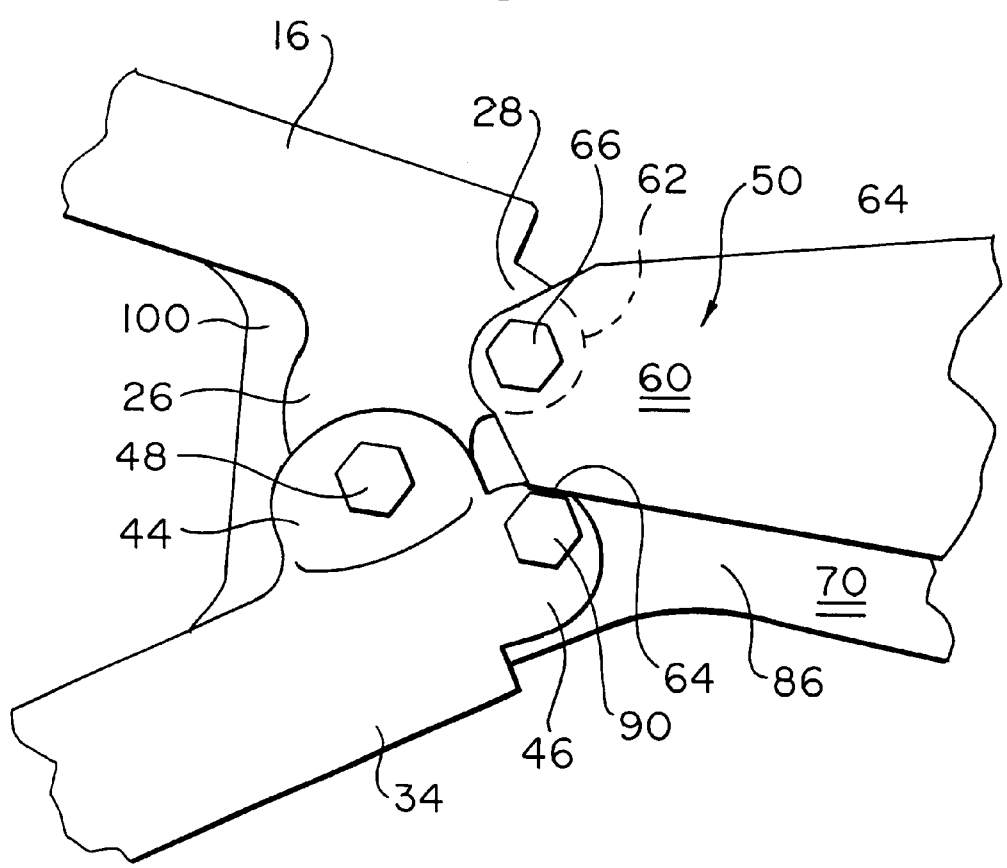
FIG. 13 is a detail opposite side view of the first, second, and fourth pivot mechanisms.

Alternatively, the individual by further squeezing of the first and second handles 16, 34 respectively may bring the recessed second traverse cutting surface 78 into shearing engagement with the first traverse cutting surface 54 to create a cut in the J-channel siding 14 between the pair of substantially parallel cuts 92 for separation of the tab 9 and creation of a notch 74 as depicted in FIGS. 7 and 8. The recessed second traverse cutting surface 78 establishes and/or prioritizes the sequence of placement of cuts within J-channel siding 14. The pair of substantially parallel cuts 92 are first made where the recessed second traverse cutting surface 78 then assists in pinching or securing the tab 9 of the J-channel siding 14 between the first traverse cutting surface 54 and the recessed second traverse cutting surface 78. The inadvertent separation of a tab 9 from the J-channel siding 14 for creation of a notch 74, therefore, does not occur without the decision by an individual to further squeeze the first and second handles 16, 34 respectively together to initiate the shearing action between the first cutter 50 and the second cutter 70. An individual is thereby able to selectively create the parallel cuts 92 in a one-step operation for bending of a tab 9 within J-channel siding 14. Alternatively, an individual may create a pair of parallel cuts 92, and elect to not bend or form a tab 9, and continue with the one-step cutting operation to separate the tab 9, for formation of a notch 74. The creation of a notch 74 is accomplished by the cutting of the tab 9 between the substantially parallel pair of cuts 92 through the shearing of the siding between the first traverse cutting surface 54 and the recessed second traverse cutting surface 78. It should be noted that an individual may elect to create either a tab 9 or notch 74 without removal of the J-channel siding 14 from the J-channel cutter 10. The J-channel cutter 10 thereby provides a significant improvement over the art where a sequence of at least two independent cuts as required in the past has been eliminated for establishment of a tab 9, and a sequence where at least three independent cuts has been eliminated to create a notch 74 during siding activities.

Figure 2:
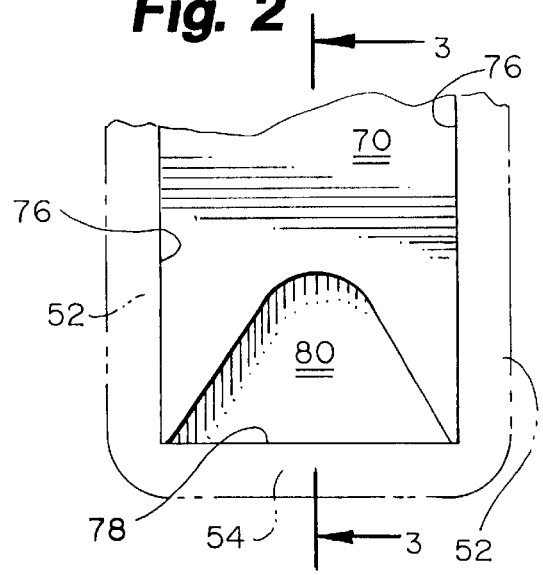
FIG. 2 is a detailed top view of the J-channel cutter.

As may be seen in FIG. 2, the recessed area 80 adjacent to the recessed second traverse cutting surface 78 is preferably substantially triangular in shape. It should be noted that the recessed area 80 may be any shape as desired by an individual including rectangular, square, oval, semi-circular, and/or any other complete or partial geometric shape at the preference of an individual provided that the essential functions, features, and attributes described herein are not sacrificed. The recessed area 80 preferably functions to assist in creating the recessed second traverse cutting surface 78 relative to the substantially parallel second cutting surfaces 76.

The support rib 82 is preferably designed to enhance the structural strength and durability of the second cutter 70 and the J-channel cutter 10. Alternatively, the second cutter 70 may be formed of solid metal material eliminating the necessity of the support rib 82 provided that sufficient pivotal rotation of the first cutter 50 relative to the second cutter 70 is maintained about the first, fourth, and third pivot mechanisms, 48, 90, and 68 respectively.

The first support cylinder 84 and the second support cylinder 88 are preferably designed to add structural strength and durability about the third and fourth pivot mechanism 68, 90 respectively, to facilitate the pivotal rotation of the first cutter 70 relative to the second handle 34 and first cutter 50. In an alternative embodiment, if the second cutter 70 is formed substantially of solid metal material, then the first support cylinder 84 and second support cylinder 88 may be eliminated with the placement of first and second bores or apertures through the second cutter 70 which are then adapted to receive the third and fourth pivot mechanism 68, 90, respectively.

The second tang 86 is preferably adapted to provide structural strength and durability to the second cutter 70 opposite to the recessed second traverse cutting surface 78 to minimize risk of shearing of the second cutter 70 from the fourth pivot mechanism 90.

In the embodiment depicted herein, the second cutter 70 is adapted for positioning within the interior dimensions of the first cutter 50. It should be noted that other embodiments may be selected where the second cutter 70 engages the exterior of the first cutter 50 during use of the J-channel cutter 10.

A biasing member 94 as depicted in FIGS. 9 and 10 is preferably adapted to engage and surround the first pivot mechanism 48. The biasing member 94 may be a torsion spring, compression spring, or any other desired mechanism for separating the first cutter 50 from the second cutter 70, and the first handle 16 from the second handle 34, when the J-channel cutter 10 is in the at-rest or open position. The biasing member 94 preferably has a first arm 96 and a second arm 98. The first arm 96 is preferably adapted to engage the first interior ledge 23 of the interior of the first bridge 22. The second arm 98 is preferably adapted to engage the second interior ledge 41 of the interior of the second bridge 40. It should be noted that the biasing member 94 is not required to be in engagement with the first pivot mechanism 48 and may be positioned proximate to the first pivot mechanism 48 for engagement to the first and second interior ledges 23, 41 respectively, provided that the essential functions, features, and attributes described herein are not sacrificed.

The biasing member 94 is preferably in the most expanded or relaxed state when the first and second handle 16, 34, respectively, are separated from each other. Alternatively, the biasing member 94 is preferably in the most compressed or tensioned state when the first and second handles 16, 34, respectively, are adjacent to each other as depicted in FIGS. 6 and 1.

A travel limiter 100 as depicted in FIGS. 9 and 10 is preferably adapted to engage the first pivot mechanism 48. The travel limiter 100 is preferably formed of metal material and includes first end 102 and a second end 104. The first end 102 is preferably adapted to engage the first interior ledge 23 of the interior of the first bridge 22 and the second end 104 is preferably adapted to engage the second interior ledge 41 of the interior of the second bridge 40, when the first and second handles 16, 34, respectively, are squeezed together, and the first cutter 50 engages the second cutter 70. The travel limiter 100 thereby prevents the second cutter 70 from being positioned an undesirable distance within the interior of the first cutter 50 where binding may occur with J-channel siding 14. The travel limiter 100 preferably limits the rotation of the second cutter 70 within the first cutter 50 where the non-cutting edge or surface 106 which is opposite to the recessed second traverse cutting surface 78 is flush with the first traverse cutting surface 54. The travel limiter 100, therefore, assists in the smooth and continuous operation of the J-channel cutter 10 by minimizing binding of J-channel siding 14 through the inadvertent insertion of the second cutter 70 an undesirable distance within the interior of the first cutter 50.

A latch 108 having a tab 110 and a resting plate 112 may be rotatably engaged to the second pivot mechanism 66. The tab 110 may be used to rotate the resting plate 112 for engagement with the fourth pivot mechanism 90 which permits the biasing member 94 to expand to separate the first handle 16 from the second handle 34, to further separate the first cutter 50 from the second cutter 70 to open the J-channel cutter 10 for receipt of J-channel siding 14. Alternatively, the resting plate 112 when positioned for engagement to the fourth pivot mechanism 90 prevents separation of the first handle 16 from the second handle 34 retaining the positioning of the first cutter 50 into closed relationship with respect to the second cutter 70.

The first cutter 50 and second cutter 70 may also be used to make finishing miter cuts of 45° to provide a visible professional appearance to the J-channel siding 14. The J-channel cutter 10 is preferably lightweight to accommodate bi-directional use by an individual through operation with either hand. The compound leverage as provided by the first, second, third and fourth pivot mechanisms 48, 66, 68, and 90, respectively, provides for a smooth cutting operation during use of the J-channel cutter 10. It should be noted that the force required to make the cuts 92 for the tab 9 are approximately 10–15 pounds per square inch less than the force required to cut the notch 74 because the recessed second traversed cutting surface 78 is radiused to prevent unwarranted shearing when cutting the tab 9 to avoid waste. It should also be noticed that the J-channel cutter 10 disclosed herein provides enhanced cutting speed over duckbill or aviation snips as known in the art.

The present invention may be embodied in other specific forms without departing from the spirit or essential attributes thereof; and it is, therefore, desired that the present embodiment be considered in all respects as illustrative and not restrictive, reference being made to the appended claims rather than to the foregoing description to indicate the scope of the invention.

In the claims:

1. I claim a tool for cutting siding comprising:
    (a) a first handle having a first cutter, said first cutter comprising a pair of substantially parallel first cutting surfaces and a first traverse cutting surface extending between said pair of substantially parallel first cutting surfaces;
    (b) a second handle pivotally connected to said first handle, said second handle having a second cutter, said second cutter comprising a pair of substantially parallel second cutting surfaces and a stepped, recessed second traverse cutting surface extending between said pair of substantially parallel second cutting surfaces;
    (c) wherein said positioning of said pair of substantially parallel second cutting surfaces adjacent to said pair of substantially parallel first cutting surfaces defines an intermediate position wherein a pair of substantially parallel cuts are made within said siding; and
    (d) wherein said positioning of said recessed second traverse cutting surface adjacent to said first traverse cutting surface defines a closed position wherein a pair of substantially parallel cuts and a traverse cut are made within said siding wherein a substantially rectangular piece of said siding is removed.

2. I claim the tool for cutting siding according to claim 1, wherein said pair of substantially parallel first cutting surfaces and said first traverse cutting surface are substantially U-shaped.

3. I claim the tool for cutting siding according to claim 2, wherein said pair of substantially parallel second cutting surfaces and said recessed second traverse cutting surface are substantially U-shaped for engagement to said pair of substantially parallel first cutting surfaces and said first traverse cutting surface inside said first cutter.

4. I claim the tool for cutting siding according to claim 2, wherein said pair of substantially parallel second cutting surfaces and said recessed second traverse cutting surface are substantially rectangular for engagement to said pair of substantially parallel first cutting surfaces and said first traverse cutting surface inside said first cutter.

5. I claim the tool for cutting siding according to claim 1, wherein said first cutter is pivotally engaged to said first handle.

6. I claim the tool for cutting siding according to claim 5, wherein said second cutter is pivotally engaged to said second handle.

7. I claim the tool for cutting siding according to claim 6, wherein said first cutter is pivotally engaged to said second cutter.

8. I claim the tool for cutting siding according to claim 1, further comprising a biasing member engaged to said first handle and to said second handle for urging said first handle and said second handle apart thereby separating said first cutter from said second cutter defining an open position.

9. I claim the tool for cutting siding according to claim 8, further comprising a travel limiter engaged to said first handle and to said second handle for limiting the positioning of said first cutter relative to said second cutter to define a closed position.

10. I claim the tool for cutting siding according to claim 9, further comprising a latch pivotally attached to said first handle adapted for engagement to said second handle for storage of said first cutter adjacent to said second cutter.

11. I claim the tool for cutting siding according to claim 9, further comprising a latch pivotally attached to said second handle adapted for engagement to said first handle for storage of said first cutter adjacent to said second cutter.

12. I claim the tool for cutting siding according to claims 10, said first cutter further comprising a stop adapted for establishing a uniform length of cut for said siding.

13. I claim the tool for cutting siding according to claim 9, further comprising a latch pivotally attached to said second handle adapted for engagement to said first handle for storage of said first cutter adjacent to said second cutter.

14. I claim a tool for cutting siding comprising:
    (a) a first handle having a first cutter, said first cutter comprising a pair of substantially parallel first cutting surfaces and a first traverse cutting surface extending between said pair of substantially parallel first cutting surfaces, and a stop adapted for establishing a uniform length of cut of said siding, said pair of substantially parallel first cutting surfaces and said first traverse cutting surface being substantially U-shaped, said first cutter being pivotally engaged to said first handle;

(b) a second handle pivotally engaged to said first handle, said second handle having a second cutter, said second cutter comprising a pair of substantially parallel second cutting surfaces and a stepped second traverse cutting surface extending between said pair of substantially parallel second cutting surfaces, said pair of substantially parallel second cutting surfaces and said recessed second traverse cutting surface being adapted to engage said pair of substantially parallel first cutting surfaces for cutting of said siding, said second cutter being pivotally engaged to said second handle, wherein the positioning of said pair of substantially parallel second cutting surfaces adjacent to said pair of substantially parallel first cutting surfaces defines an intermediate position wherein a pair of substantially parallel cuts are made within said siding, wherein the positioning of said recessed second traverse cutting surface adjacent to said first traverse cutting surface defines a closed cutting position wherein a pair of substantially parallel cuts and a traverse cut are made within said siding wherein a substantially rectangular piece of said siding is removed;

(c) a biasing member engaged to said first handle and to said second handle for urging said first handle and said second handle apart thereby separating said first cutter from said second cutter defining an open position;

(d) a travel limiter engaged to said first handle and to said second handle for limiting the positioning of said first cutter relative to said second cutter; and (e) a latch pivotally attached to said first handle for engagement to said second handle for storage of said first cutter adjacent to said second cutter.

* * * * *